United States Patent [19]

Zahid

[11] 4,077,100

[45] Mar. 7, 1978

[54] METHOD OF FORMING PRESSURE ACCUMULATOR

[75] Inventor: Abduz Zahid, Los Angeles, Calif.

[73] Assignee: Greer Hydraulics, Inc., Los Angeles, Calif.

[21] Appl. No.: 675,519

[22] Filed: Apr. 9, 1976

Related U.S. Application Data

[62] Division of Ser. No. 552,425, Feb. 24, 1975.

[51] Int. Cl.[2] .......... B23P 15/00

[52] U.S. Cl. .......... 29/157 R; 29/445; 29/454; 138/30

[58] Field of Search .......... 29/157 R, 454, 428, 29/422, 445; 138/30; 425/DIG. 1

[56] References Cited

U.S. PATENT DOCUMENTS

| | | | |
|---|---|---|---|
| 2,030,818 | 2/1936 | Harter | 29/407 |
| 2,279,726 | 4/1942 | Allen | 29/428 |
| 2,345,124 | 3/1944 | Huber | 138/30 |
| 3,397,719 | 8/1968 | Ortheil | 138/30 |
| 3,500,866 | 3/1970 | Greer | 138/30 |
| 3,623,512 | 11/1971 | Ellwanger | 138/30 |
| 3,674,054 | 7/1972 | Mercier | 138/30 |
| 3,675,308 | 7/1972 | Zeigler | 29/454 |
| 3,847,182 | 11/1974 | Greer | 138/30 |

FOREIGN PATENT DOCUMENTS

| | | | |
|---|---|---|---|
| 1,122,092 | 7/1968 | United Kingdom | 29/454 |

*Primary Examiner*—C.W. Lanham
*Assistant Examiner*—Daniel C. Crane
*Attorney, Agent, or Firm*—Arthur B. Colvin

[57] ABSTRACT

The method of forming a pressure vessel which comprises the steps of molding the mouth of the deformable separator or bladder of the pressure vessel to one end of a cylindrical member or sleeve; thereupon inserting the end portion of the cylindrical sleeve to which the bladder is molded into the open mouth of a second cylindrical member defining the body of the accumulator, the second cylindrical member having one end conformed as a hemisphere having an axial passageway; securing together adjacent end portions of the two cylindrical members as by welding and thereupon closing the open end of the first cylindrical member to form the end closure of the gas member of the pressure vessel.

5 Claims, 4 Drawing Figures

METHOD OF FORMING PRESSURE ACCUMULATOR

This application is a division of copending application Ser. No. 552,425, filed Feb. 24, 1975.

This invention relates to the art of pressure vessels and method of forming same and more particularly to a pressure accumulator of the type having a rigid casing with a deformable separator therein in the form of a bladder defining two chambers, one of which is charged with gas under pressure and the other of which is charged with oil under pressure.

As conductive to an understanding of the invention, it is to be noted that in the forming of a pressure accumulator of the above type, where the accumulator comprises a casing of rigid material having one end closed with an oil port defined in such closed end, and the other end defining an open mouth which is closed by a separate plug having an axial opening to receive a gas charging valve by means of which the gas chamber defined by the separator or bladder positioned in the casing may be charged with gas under pressure, where the plug has to be machined and secured in the open mouth of the casing as by welding or by spinning or rolling the open mouth of the casing over the periphery of the plug or by similar means, the cost of manufacture is considerable.

It is accordingly among the objects of the invention to provide a pressure accumulator of the above type which may readily be manufactured at relatively low cost with the use of relatively inexpensive components which may readily be formed and which dispenses with the need of a separate closure plug to seal the open end of the casing and with the need of separate means to retain the bladder in fixed position in the container.

According to the invention these objects are accomplished by the arrangement and combination of elements hereinafter described and more particularly recited in the claims.

In the accompanying drawings in which is shown one or more of various possible embodiments of the several features of the invention;

Figure 1:
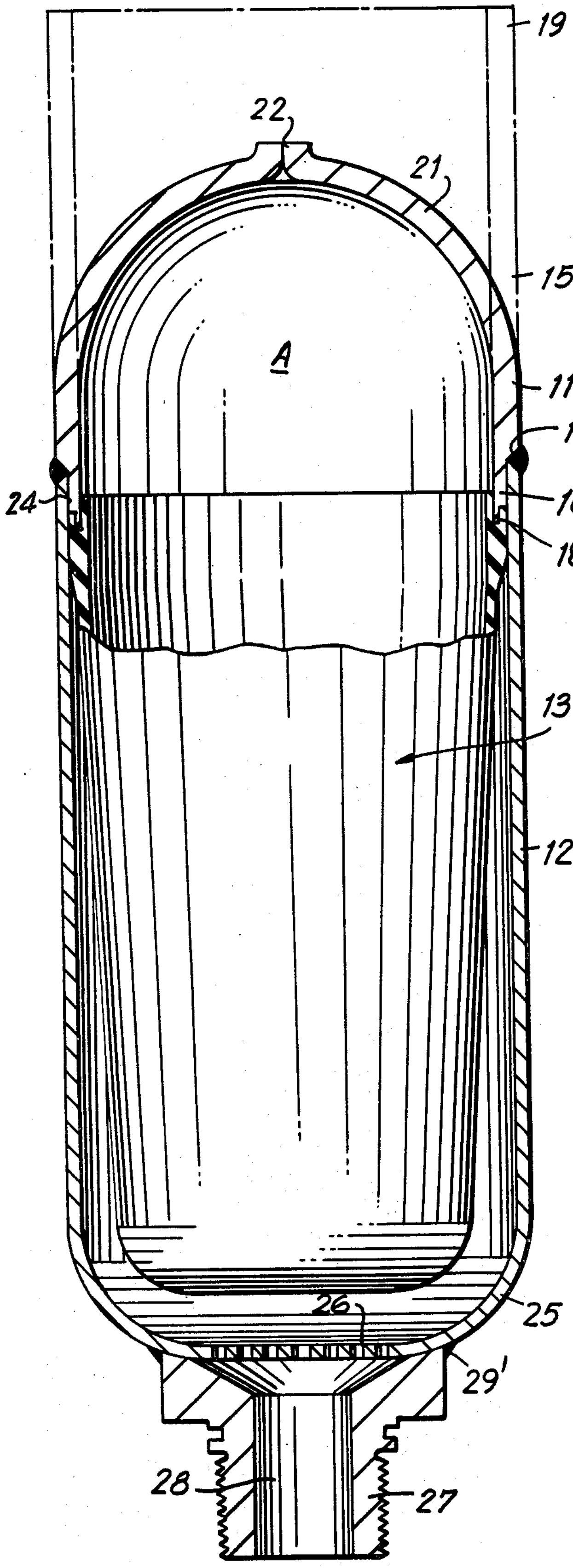
FIG. 1 is a longitudinal sectional view of the pressure accumulator with parts broken away.
Figure 2:
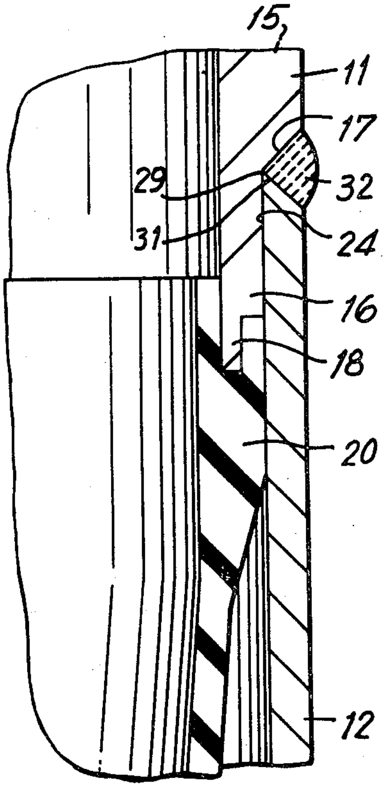
FIG. 2 is a detail longitudinal sectional view on a greatly enlarged scale of the embodiment of FIG. 1.

Referring now to the drawings, in the embodiment shown in FIGS. 1 and 2, the accumulator comprises a pair of shell portions 11 and 12, the former mounting a deformable separator 13.

The shell portion 11 is formed from a cylindrical member or sleeve 15 open at both ends as shown in broken lines in FIG. 1. The sleeve 15 is formed with a reduced outer diameter at one end as at 16, defining an embodiment shoulder 17 which is beveled as shown. The free end of portion 16 has an annular lip 18 extending longitudinally from its inner periphery, to which is secured as by molding the thickened rim 20 of the separator 13. The separator preferably is an enlarged deformable bladder of resilient material such as natural or synthetic rubber having like characteristics.

After the bladder 13 is molded to the open sleeve 15, in the next step of manufacture, the reduced diameter portion 16 of shell portion 11 is then inserted into the shell portion 12, which is in the form of an enlarged cylindrical member having an open mouth 24 and a closed hemispherical end portion 25 which has a plurality of perforations 26 defining fluid passageways arranged around the axial end portion thereof. An outlet fitting 27 having a bore 28 therethrough is secured as by welding at 29' to the hemispherical end portion 25. The shell portion 12 may be formed in conventional manner as by deep drawing.

It is to be noted that the reduced diameter portion 16 of sleeve portion 15 is inserted into the open mouth 24 of the shell portion 12 until the inner edge 29 of the beveled shoulder 17 abuts against the inner periphery 31 of the mouth 24 which is also beveled, the opposed beveled surfaces defining an annular V-groove which receives welding material as at 32 to retain the portions 11 and 12 in fixed position and to define a seal.

Thereupon, the open end 19 of the sleeve 15 is deformed inwardly either by being spun closed in conventional manner, or hot formed in a press to define a hemispherical end 21 for the shell portion 11.

In the embodiment shown in FIGS. 1 and 2, the end 19 of the sleeve 15 is squeezed together as at 22 as shown in full lines, by the forming process so that a gas-tight seal will be formed.

In order that the gas chamber A of the accumulator may be pressurized, the open end 19 of the sleeve 15 is spun closed in a pressurized chamber. Thus, gas under pressure will be entrapped in the bladder 13 and the associated shell portion 11, the hemispherical end 21 thus formed, defining the end of the gas chamber A of the pressure accumulator.

Figure 3:
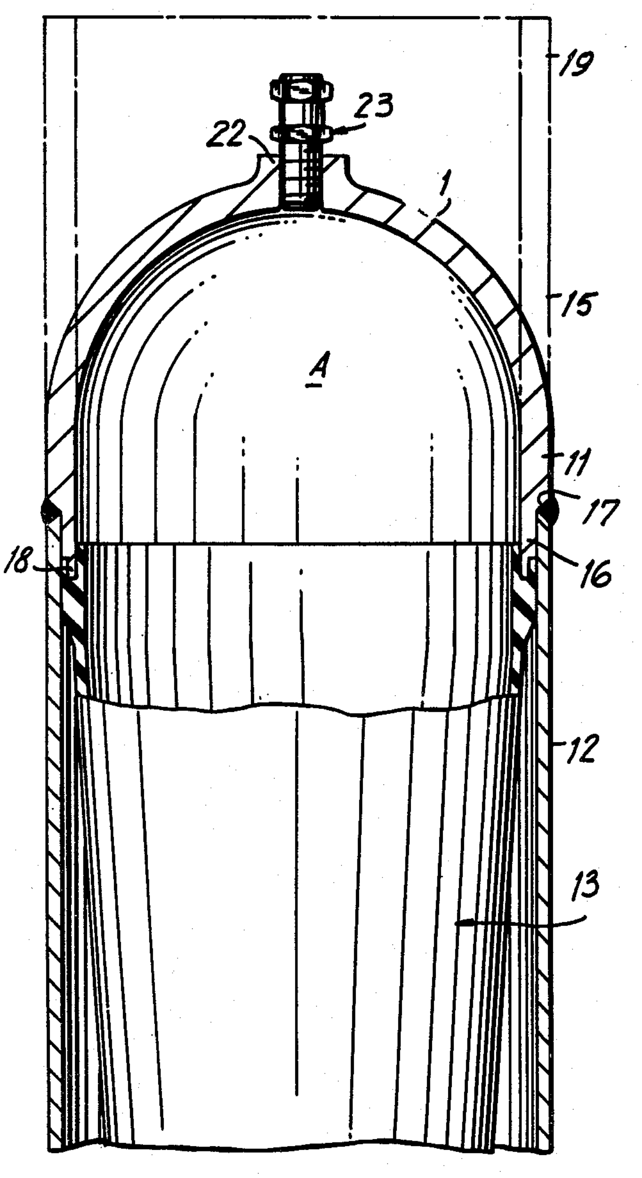
FIG. 3 is a fragmentary detail view of another embodiment of the invention.

If desired, the end 19 of sleeve 15 may be closed as at 22 as previously described, but not in a pressurized chamber. Thereupon, the end 22 can then be drilled and tapped as shown in FIG. 3 to receive a conventional gas charging valve 23 by means of which the bladder 13 may be charged with gas under pressure.

Figure 4:
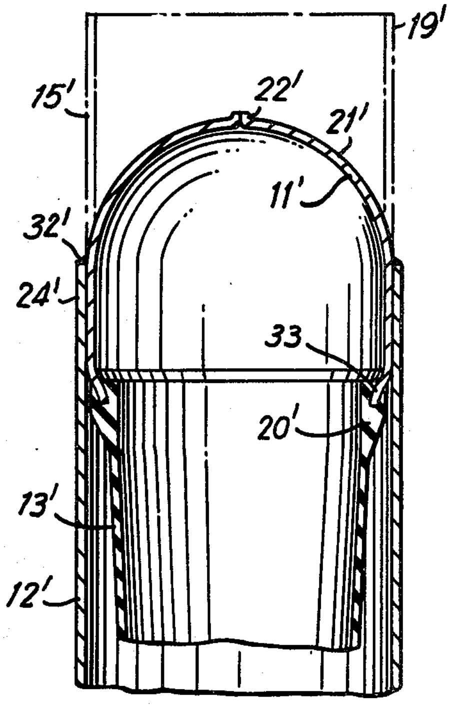
FIG. 4 is a longitudinal sectional view with parts broken away of another embodiment of the invention.

The embodiment shown in FIG. 4 is similar to the embodiment shown in FIGS. 1 and 2 and corresponding elements have the same reference numerals primed.

In this embodiment, the sleeve 15' has one end 33 thereof inclined inwardly to define an annular supporting flange to which the thickened rim 20' of the bladder 13' is molded. Thereupon, the sleeve 15' with the bladder 13' secured thereto is inserted into the open mouth 24' of shell portion 12' which may be identical to shell portion 12 shown in FIG. 1. The inner diameter of shell portion 12' adjacent its mouth and the outer diameter of sleeve 15' are such that the sleeve 15' will be retained in the mouth 24' of shell portion 12' by force fit and the outer portion of sleeve 15' will protrude from the mouth 24' of shell portion 12'. The sleeve 15' and the shell portion 12' are secured together as by welding at 32'.

Thereupon, the end 19' of the shell 15' may be spun closed in a pressurized chamber so that when the end 19' is squeezed together to seal such end as at 22' gas under pressure will be entrapped in the bladder 13' and the sleeve 15' which would thus have a hemispherical end portion 21'.

It is also within the scope of the invention to close the end 19' by either hot forming in a press or by spinning without charging the bladder with gas under pressure and thereupon the closed end 22' may be drilled and tapped as previously described with respect to the embodiment of FIG. 3 to receive a conventional gas charging valve (not shown) as previously described.

With the process above described it is apparent that a pressure accumulator may be formed in a relatively simple manner with a minimum number of components. By reason of the fact that the sleeve portion 15 and 15', shown in FIGS. 1 and 4, not only serves as the support for the bladder, but also defines the closed end 21, 21' of the gas chamber, there is no need to have a separate end closure plug or member to close the end of the sleeve portion 15, 15'. As a result, the cost of manufacture is reduced greatly.

Having thus described my invention, what I claim as new and desire to secure by Letters Patent of the United States is:

1. The method of forming a pressure accumulator of the type having a deformable separator therein in the form of a bladder having an enlarged diameter open mouth and a closed end, which comprises the steps of forming a first shell portion having a cylindrical body with an open mouth at one end and a closed portion at the other end, said closed portion having a passageway therethrough, providing a cylindrical sleeve open at one end and having said enlarged diameter mouth of said bladder bonded to the other end, said closed end of said bladder projecting beyond said other end of said sleeve, inserting said other end of said sleeve and said closed end of said bladder into the open mouth of the cylindrical body of said first shell portion, securing said shell portion and said sleeve together at a position adjacent said mouth of said shell, and thereafter deforming said open end of said cylindrical sleeve inwardly to close said theretofore open end of said sleeve and entrap the surrounding atmosphere.

2. The method recited in claim 1 in which said open end of the sleeve is deformed inwardly in a pressurized chamber so that when said open end of the sleeve is closed, gas under pressure will be confined in the gas chamber defined by the bladder and the then closed end of the sleeve.

3. The combination set forth in claim 1 in which after said open end of the sleeve is closed, the axial portion of said closed end is drilled and tapped to receive a gas charging valve.

4. The process set forth in claim 1 in which said open end of the sleeve is closed as by spinning.

5. The combination set forth in claim 1 in which said open end of the sleeve is closed by being hot formed in a press.

* * * * *